US008662296B2

(12) United States Patent
Preece (10) Patent No.: US 8,662,296 B2
(45) Date of Patent: Mar. 4, 2014

(54) BOOKLET FORM PAPERBOARD PACKAGE FOR MEDIA DISCS

(75) Inventor: Mark Preece, Valencia, CA (US)

(73) Assignee: Atlas AGI Holdings, LLC, Greenwich, CT (US)

( * ) Notice: Subject to any disclaimer, the term of this patent is extended or adjusted under 35 U.S.C. 154(b) by 0 days.

(21) Appl. No.: 13/091,659

(22) Filed: Apr. 21, 2011

(65) Prior Publication Data

US 2012/0267267 A1    Oct. 25, 2012

(51) Int. Cl.
*B65D 85/57* (2006.01)
(52) U.S. Cl.
USPC .................. 206/308.1; 206/312; 206/472
(58) Field of Classification Search
USPC ........... 206/308.1, 311, 312, 308.2, 307, 815, 206/472, 477, 478
See application file for complete search history.

(56) References Cited

U.S. PATENT DOCUMENTS

| | | | | | |
|---|---|---|---|---|---|
| 4,245,773 | A | * | 1/1981 | Stollberg | 206/509 |
| 5,422,875 | A | * | 6/1995 | Bribach | 720/726 |
| 5,518,488 | A | * | 5/1996 | Schluger | 493/82 |
| 5,588,528 | A | * | 12/1996 | Ozeki | 206/308.1 |
| 5,788,069 | A | * | 8/1998 | Calhoun et al. | 206/312 |
| 5,921,386 | A | * | 7/1999 | Smith | 206/308.1 |
| 6,112,901 | A | * | 9/2000 | Noga et al. | 206/723 |
| 6,158,579 | A | * | 12/2000 | Rosenbaum | 206/45.29 |
| 6,250,462 | B1 | * | 6/2001 | Kato | 206/312 |
| 6,454,090 | B1 | * | 9/2002 | Flores et al. | 206/308.1 |
| 6,783,000 | B1 | * | 8/2004 | Price et al. | 206/308.1 |
| 6,837,370 | B2 | * | 1/2005 | Shindo et al. | 206/308.1 |
| 7,905,347 | B2 | * | 3/2011 | Osborn et al. | 206/308.1 |
| 7,905,348 | B2 | * | 3/2011 | Gustafsson et al. | 206/312 |
| 2002/0033348 | A1 | * | 3/2002 | Flores et al. | 206/308.1 |
| 2002/0033349 | A1 | * | 3/2002 | Shindo et al. | 206/308.1 |
| 2002/0100701 | A1 | * | 8/2002 | Chiu | 206/308.1 |
| 2003/0015443 | A1 | * | 1/2003 | Flores et al. | 206/310 |
| 2004/0089566 | A1 | * | 5/2004 | Iskanian et al. | 206/308.1 |
| 2004/0262177 | A1 | * | 12/2004 | Rossiter | 206/312 |
| 2008/0017536 | A1 | * | 1/2008 | Wynalda et al. | 206/308.1 |
| 2008/0251398 | A1 | * | 10/2008 | Giraud | 206/308.1 |
| 2008/0257764 | A1 | * | 10/2008 | Crouan | 206/308.1 |
| 2009/0288968 | A1 | * | 11/2009 | Wynalda, Jr. | 206/308.1 |
| 2009/0314669 | A1 | * | 12/2009 | Caraher | 206/308.1 |
| 2010/0044258 | A1 | * | 2/2010 | Siecke | 206/308.1 |

* cited by examiner

*Primary Examiner* — Steven A. Reynolds
(74) *Attorney, Agent, or Firm* — Pillsbury Winthrop Shaw Pittman LLP (57) ABSTRACT

A package for holding an item, and a method of making the same are provided. The package includes a plurality of page spread blanks, a front endsheet blank and a back endsheet blank. The blanks include a disc receiving opening and a pair of disc securing lugs. The disc securing lugs are adapted to contact an outer periphery of an item placed into the disc receiving opening and removed from the disc receiving opening. The front endsheet blank is connected to one of the plurality of page spread blanks and the back endsheet blank is connected along to another of the plurality of page spread blanks.

10 Claims, 8 Drawing Sheets

BOOKLET FORM PAPERBOARD PACKAGE FOR MEDIA DISCS

TECHNICAL FIELD

The present invention relates generally to a closable storage package for a recording medium, and more particularly, to a package comprising a paperboard book-like assembly for storing one or more discs.

BACKGROUND

Various types of planar discs are in use at the present time to record and store information which is to be retrieved by various means, such as optical or magnetic readers. Common examples of these discs include compact discs that contain digitally stored information that may be read by a laser, DVD type discs, and Blu-ray type discs. Such discs can store audio information, such as music, video information, such as movies and television shows, and digital information, such as computer software. In many instances the discs are sold to a consumer already containing information, such as an album or a movie, but in other situations blank discs are sold to the consumer to allow the consumer to add content to the disc.

Media discs, such as, compact discs, DVDs, Blu-ray discs, and the like, are typically packaged in injection molded plastic enclosures designed to hold one or more media discs for protecting the discs during storage and shipment. One common enclosure currently used with media discs is a "jewel box" type case that typically has a base, an insert or tray that is placed within the base, and a cover that is hingedly connected to the base to allow the cover to be opened and the disc removed from the tray. The insert often has a center projection that is utilized to engage a center opening on the media disc in order to secure the media disc within the tray. More specifically, a "rosette" on the center projection engages the periphery of the center opening of the media disc.

Other enclosures utilize a book-like structure made from paper or paperboard to hold a media disc. An example of such a book-like structure is found in commonly assigned U.S. patent application Ser. No. 12/605,657 filed on Oct. 26, 2009, which is incorporated by reference in its entirety herein. Paper and paperboard enclosures may be beneficial in that they may be more easily manufactured and assembled than some plastic cases, and may also be more environmentally friendly. However, existing paper and paperboard enclosures often do not secure the discs in a satisfactory manner. Therefore, a need exists for a paper or paperboard enclosure for media discs that secures the discs.

SUMMARY

According to one embodiment, a blank for use in forming a book-like package comprises a first panel, a second panel and a third panel. The first panel has a first disc receiving opening. A first disc securing lug is disposed proximate a periphery of the first disc receiving opening and projects inward from the periphery of the disc receiving opening. A second disc securing lug is disposed proximate a periphery of the first disc receiving opening and projects inward from the periphery of the first disc receiving opening. The second disc securing lug is disposed generally opposite of the first disc securing lug relative to the disc receiving opening. The second panel connects to the first panel. The third panel connects to the second panel.

According to another embodiment, a package for holding an item comprises a plurality of page spread blanks, a front endsheet blank, and a back endsheet blank. The plurality of page spread blanks each comprise four panels. The first panel is adhesively secured to a second panel. A fourth panel is adhesively secured to a third panel. A fold is disposed between the second panel and the third panel. The first panel and the fourth panel further comprise a disc receiving opening and a pair of disc securing lugs. The disc securing lugs are adapted to contact an outer periphery of an item placed into the disc receiving opening and removed from the disc receiving opening. The front endsheet blank comprises three panels. A third panel is adhesively secured to a second panel. The third panel further comprises a disc receiving opening and a pair of disc securing lugs. The disc securing lugs are adapted to contact an outer periphery of an item placed into the disc receiving opening. The back endsheet blank comprises three panels. A first panel is adhesively secured to a second panel. The first panel further comprises a disc receiving opening and a pair of disc securing lugs. The disc securing lugs are adapted to contact an outer periphery of an item placed into the disc receiving opening and removed from the disc receiving opening. The front endsheet blank is connected to one of the plurality of page spread blanks and the back endsheet blank is connected along to another of the plurality of page spread blanks.

According to one process a method of forming a package for holding an item is provided. At least one page spread blank is provided that comprises four panels. A first panel is adhesively secured to a second panel. A fourth panel is adhesively secured to a third panel. A fold is disposed between the second panel and the third panel. The first panel and the fourth panel further comprise a disc receiving opening and a pair of disc securing lugs. The disc securing lugs are adapted to contact an outer periphery of an item placed into the disc receiving opening and removed from the disc receiving opening. A front endsheet blank is provided that comprises three panels. A third panel is adhesively secured to a second panel. The third panel further comprises a disc receiving opening and a pair of disc securing lugs. The disc securing lugs are adapted to contact an outer periphery of an item placed into the disc receiving opening and removed from the disc receiving opening. A back endsheet blank is also provided that comprises three panels. A first panel is adhesively secured to a second panel. The first panel further comprises a disc receiving opening and a pair of disc securing lugs. The disc securing lugs are adapted to contact an outer periphery of an item placed into the disc receiving opening and removed from the disc receiving opening. The at least one page spread blank is attached to the front endsheet blank such that a first disc receiving opening of the page spread blank is disposed adjacent to and faces the disc receiving opening of the front endsheet blank. The at least one page spread blank is attached to the back endsheet blank such that a second disc receiving opening of the page spread blank is disposed adjacent to and faces the disc receiving opening of the back endsheet blank. A first disc receiving pocket is formed between the disc receiving openings of front endsheet blank and the page spread blank. A second disc receiving pocket is formed between the disc receiving openings of the back endsheet blank and the page spread blank.

DETAILED DESCRIPTION

Figure 1:
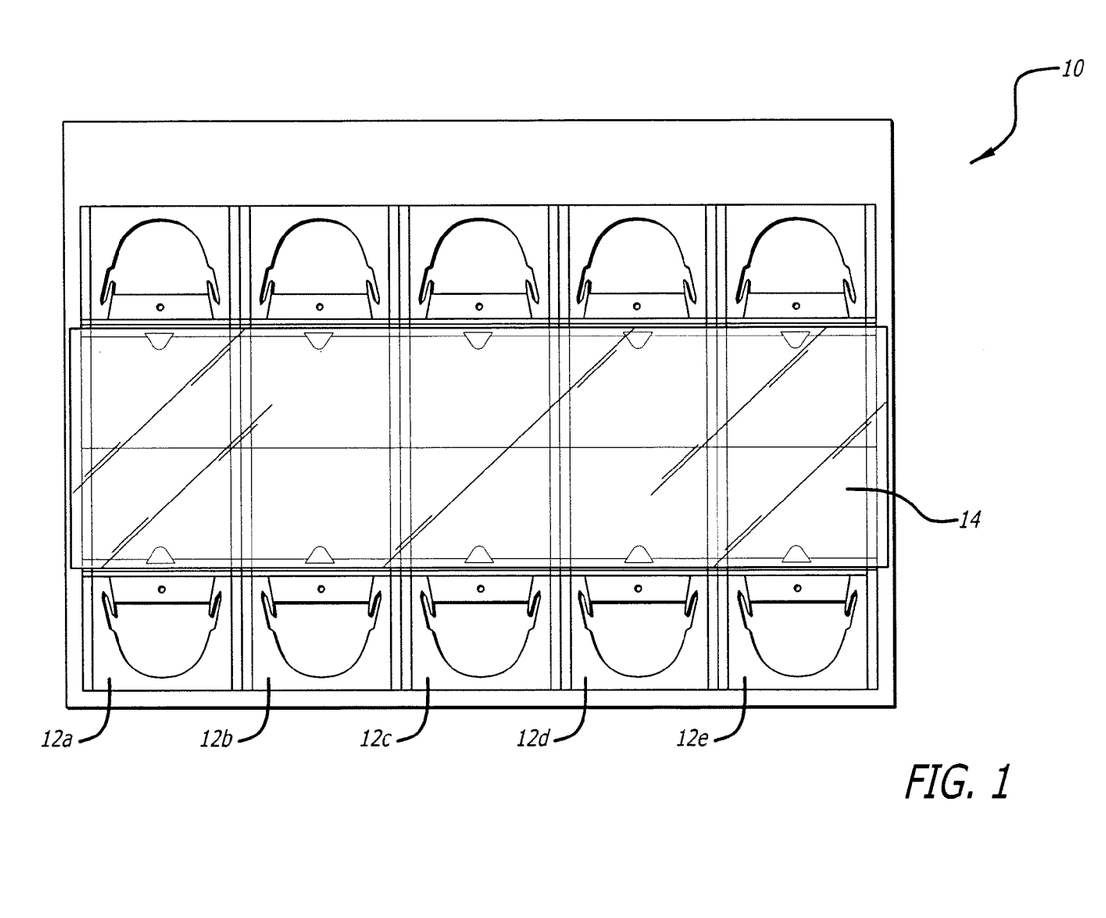
FIG. 1 is a top view of a sheet containing a plurality of blanks for page spreads used for forming part of a media package.

The present disclosure is for a book-like package or container for optical media discs, such as CDs, DVDs, Blu-ray discs, and the like. FIG. 1 shows a sheet 10 containing a plurality of page spread blanks 12a-12e for a page spread of a book-like package for optical media discs. The sheet 10 is stamped by a press in order to form the plurality of blanks 12a-12e. The stamping of the sheet 10 forms each individual blank 12a-12e, and also cuts the sheet 10 so that the individual blanks 12a-12e may be separated. FIG. 1 shows that the individual blanks 12a-12e are generally identical in shape, however, it is additionally contemplated that variations may exist between the individual blanks 12a-12e. The sheet 10 typically contains printing that is intended to be present in a finished book-like package or container, such as text, graphics, and/or a mixture of text and graphics.

As shown in FIG. 1, a gloss laminated strip 14 may be applied over a center portion of the sheet 10. The gloss laminated strip 14 acts as a scratch limiting surface, such that media discs placed into a book-like package made from the individual blanks 12a-12e are less likely to be scratched.

Figure 2:
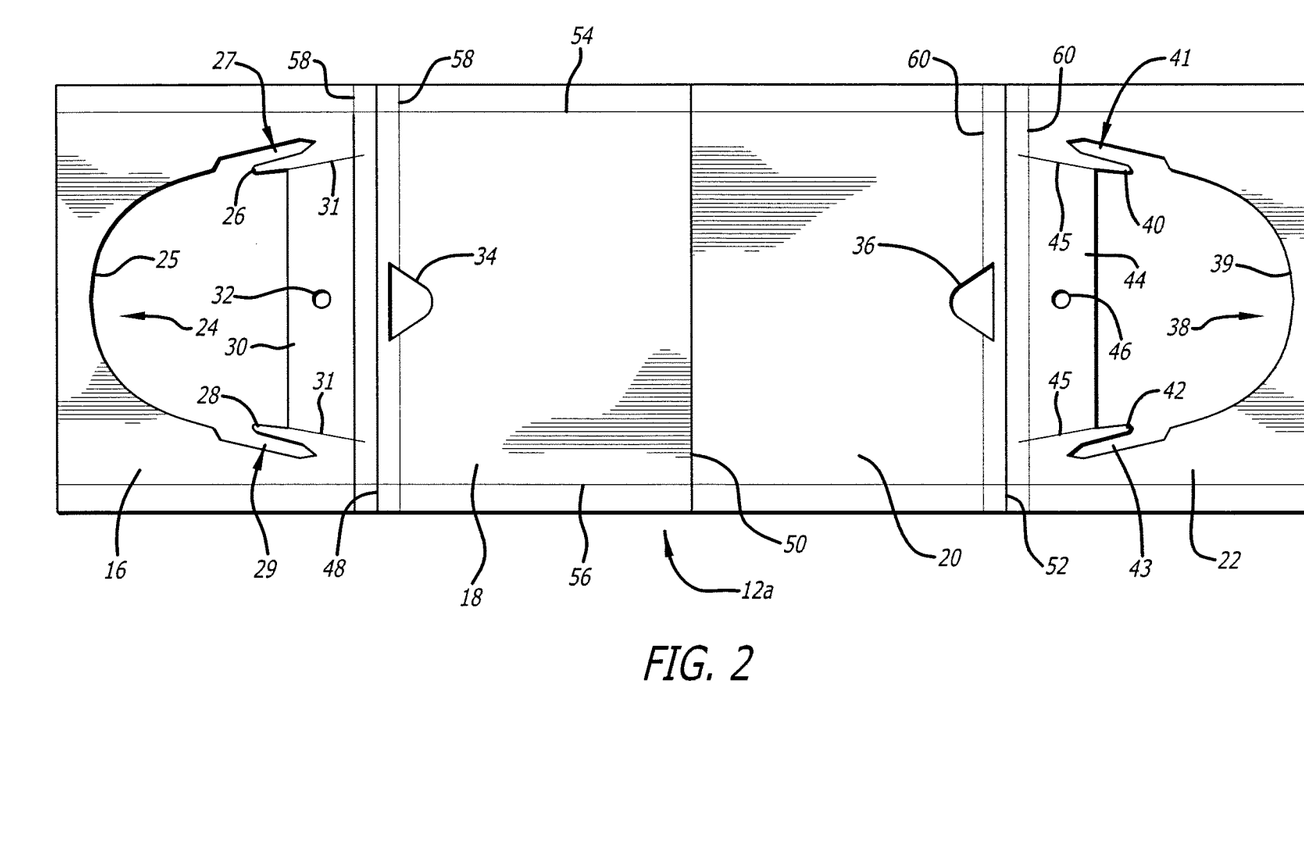
FIG. 2 is a top view of a blank for a page spread used for forming part of a media package.

Turning now to FIG. 2 a representative individual blank 12a is depicted. The blank 12a comprises a first outer panel 16, a second inner panel 18, a third inner panel 20, and a fourth outer panel 22. The first panel 16 has a first disc receiving opening 24 formed therein. The disc receiving opening 24 is formed during the stamping of the sheet 10. The first disc receiving opening 24 has a partially circular periphery 25. The partially circular periphery 25 is sized so as to be generally identical in shape and size to an outer periphery of a media disc, such as a CD, DVD, or Blu-ray disc.

The first panel 16 additionally comprises a first disc securing lug 26. The first disc securing lug 26 additionally has an inner periphery with an arc-shape so as to complement the outer periphery of the media disc. A first gap 27 is formed during the stamping process and is disposed adjacent the first disc securing lug 26. The first gap 27 is in communication with the first disc receiving opening 24. The first gap 27 allows the first disc securing lug 26 to flex outward, toward a top periphery of the first panel 16, when a media disc is inserted into a book-like package made from a plurality of blanks, such as blank 12a. The first panel 16 also comprises a second disc securing lug 28. The second disc securing lug 28 additionally has an inner periphery with an arc-shape so as to complement the outer periphery of the media disc. A second gap 29 is formed during the stamping process and is disposed adjacent the second disc securing lug 28. The second gap 29 is in communication with the first disc receiving opening 24. The second gap 29 allows the second disc securing lug 28 to flex outward, toward a bottom periphery of the first panel 16, when a media disc is inserted into a book-like package made from a plurality of blanks, such as blank 12a.

The first disc securing lug 26 and the second disc securing lug 28 allow a media disc to be secured within the book-like package made from the plurality of blanks. The first disc securing lug 26 and the second disc securing lug 28 work in concert to maintain the disc within the disc receiving opening 24. As a disc is inserted into the disc receiving opening 24, an outer periphery of the disc contacts the inner periphery of the first disc securing lug 26 and the inner periphery of the second disc securing lug 28. As force is applied to insert the disc, the first disc securing lug 26 flexes towards the first gap 27 (See FIG. 4), while the second disc securing lug 28 flexes towards the second gap 29. As the disc is further inserted into the disc receiving opening 24 a widest point of the outer periphery of the disc passes the first disc securing lug 26 and the second disc securing lug 28, and the disc securing lugs 26, 28 rebound to their original arrangement. Thus, while inserting the disc, the securing lugs 26, 28 flex outward to create a sufficiently wide opening for the disc to pass, but as the disc passes the securing lugs 26, 28, they flex back inwards to their initial state, thereby securing the disc within the disc receiving opening 24, because the distance between the first disc securing lug 26 and the second disc securing lug 28 is less than the diameter of the disc. However, as the disc securing lugs 26, 28 are offset from the portion of the disc receiving opening 24 where the center of the disc is positioned, the disc securing lugs 26, 28 are still proximate the outer periphery of the disc when the disc is fully within the disc receiving opening 24.

In one example, for a typical DVD disc, it is contemplated that the distance between the first disc securing lug 26 and the second disc securing lug 28 is about 0.125 inches less than a diameter of a disc. Thus, if each of the disc securing lugs flexes about 0.0625 inches, a sufficient distance between the lugs 26, 28 is provided to insert and remove the disc from the disc receiving opening. It is contemplated that discs of different dimensions can also be accommodated and may require commensurate dimensional modifications to the lugs 26, 28.

To remove a disc from the book-like package, the disc will again contact the disc securing lugs 26, 28 and cause them to flex outward much in the same way as when a disc is inserted in to the disc receiving opening. A user must apply force to the disc to cause the disc securing lugs 26, 28 to flex outward, creating a sufficient gap between the first disc securing lug 26 and the second disc securing lug 28 to allow the disc to pass therebetween. Thus, the disc is not able to fall out of the disc receiving opening 24, but must be removed from the disc receiving opening 24 by a user. This limits the likelihood of discs being damaged or broken if the book-like package is tilted on edge.

Additionally, the first panel comprises a waste strip 30. The waste strip 30 is removed during additional manufacturing steps of the book-like package. The waste strip 30 is provided with score lines 31 on each side of the waste strip 30, providing the waste strip 30 with a generally trapezoidal shape. The waste strip 30 is generally disposed between the first disc securing lug 26 and the second disc securing lug 28. The waste strip 30 is removed during a cutting operation that provides access to the first disc receiving portion 24 once the book-like package made from a plurality of blanks, such as blank 12a, is assembled. The waste strip 30 has a hole 32 formed therein. The hole 32 is provided in order to facility removal of the waste strip 30 following the cutting operation that provides access to the first disc receiving portion 24 once the book-like package made from a plurality of blanks, such as blank 12a, is assembled.

The blank 12a additionally comprises a second panel 18. The second panel 18 comprises a thumb notch 34 formed therein. The thumb notch 34 allows a user to access a portion of a disc stored within a book-like package formed from a plurality of the blanks 12a.

The blank 12a also comprises a third panel 20. The third panel 20 comprises a thumb notch 36 formed therein. The thumb notch 36 allows a user to access a portion of a disc stored within a book-like package formed from a plurality of the blanks 12a. The third panel 20 is generally a mirror image of the second panel 18.

The blank 12a further comprises a fourth panel 22. The fourth panel 22 has a second disc receiving opening 38 formed therein. The disc receiving opening 38 is formed during the stamping of the sheet 10. The second disc receiving opening 38 has a partially circular periphery 39. The partially circular periphery 39 is sized so as to be generally identical in shape and size to an outer periphery of a media disc, such as a CD, DVD, or Blu-ray disc.

The fourth panel 22 additionally comprises a third disc securing lug 40. The third disc securing lug 40 additionally has an inner periphery with an arc-shape so as to complement the outer periphery of the media disc. A third gap 41 is formed during the stamping process and is disposed adjacent the third disc securing lug 40. The third gap 41 is in communication with the second disc receiving opening 38. The third gap 41 allows the third disc securing lug 40 to flex outward, toward a top periphery of the fourth panel 22, when a media disc is inserted into a book-like package made from a plurality of blanks, such as blank 12a. The fourth panel 22 also comprises a fourth disc securing lug 42. The fourth disc securing lug 42 additionally has an inner periphery with an arc-shape so as to complement the outer periphery of the media disc. A fourth gap 43 is formed during the stamping process and is disposed adjacent the fourth disc securing lug 42. The fourth gap 43 is in communication with the second disc receiving opening 38. The fourth gap 43 allows the fourth disc securing lug 42 to flex outward, toward a bottom periphery of the fourth panel 22, when a media disc is inserted into a book-like package made from a plurality of blanks, such as blank 12a.

The third disc securing lug 40 and the fourth disc securing lug 42 allow a media disc to be secured within the book-like package made from the plurality of blanks 12a like the first and second disc securing lugs 26, 28 described above.

Additionally, the fourth panel comprises a waste strip 44. The waste strip 44 is removed during additional manufacturing steps of the book-like package. The waste strip 44 is provided with score lines 45 on each side of the waste strip 44, providing the waste strip 44 with a generally trapezoidal shape. The waste strip 44 is removed during a cutting operation that provides access to the first disc receiving portion 38 once the book-like package made from a plurality of blanks, such as blank 12a, is assembled. The waste strip 44 has a hole 46 formed therein. The hole 46 is provided in order to facilitate removal of the waste strip 44 following the cutting operation that provides access to the first disc receiving portion 38 once the book-like package made from a plurality of blanks, such as blank 12a, is assembled.

A first score line 48 is provided between the first panel 16 and the second panel 18. The first score line 48 allows the first panel 16 to fold relative to the second panel 18. A second score line 50 is provided between the second panel 18 and the third panel 20. The second score line 50 is generally located at a center of the blank 12a. A third score line 52 is provided between the third panel 20 and the fourth panel 22. The score lines 48, 50, 52 are formed on the blank 12a during the punching of the sheet 10. The score lines 48, 50, 52 thus provide locations where the panels 16, 18, 20, 22 may be folded relative to an adjacent panel.

In addition to the score lines 48, 50, 52, FIG. 2 additionally depicts trim lines 54, 56, 58, and 60 on the blank 12a. The trim lines 54, 56, 58, and 60 indicate locations of the blank 12a that will be cut away when the blank 12a is used in the formation of a book-like package, after multiple blanks have been formed into the book-like package. For instance, the first trim line 54 is disposed proximate a top surface of the blank 12a and runs through all four panels 16, 18, 20, and 22. Similarly, the second trim line 56 is disposed proximate a bottom surface of the blank 12a and runs through all four panels 16, 18, 20, and 22. Thus, the first trim line 54 and the second trim line 56 reduce the height of the blank 12a.

The third trim line 58 is shown on both the first panel 16 and the second panel 18. The third trim line 58 is made after the first panel 16 has been adhesively secured to the second panel 18, as will be described in greater detail below. The third trim line 58 intersects with the score lines 31 of the waste strip 30, thus the third trim line 58 will allow the separation of the waste strip 30 from the panel 16. The third trim line 58 additionally intersects with the thumb notch 34. Thus, the thumb notch 34 will be in communication with the first disc receiving opening 24 allowing access to a disc within the disc receiving opening 24 when the first panel 16 is adhesively secured to the second panel 18.

Similarly, the fourth trim line 60 is shown on both the third panel 20 and the fourth panel 22. The fourth trim line 60 is made after the fourth panel 22 has been adhesively secured to the third panel 20, as described in greater detail below. The fourth trim line 60 intersects with the score lines 45 of the waste strip 44, thus the fourth trim line 60 will allow the separation of the waste strip 44 from the fourth panel 22. The fourth trim line 60 additionally intersects with the thumb notch 36. Thus, the thumb notch 36 will be in communication with the second disc receiving opening 38, allowing access to a disc within the disc receiving opening 38 when the fourth panel 22 is adhesively secured to the third panel 20.

Figure 3:
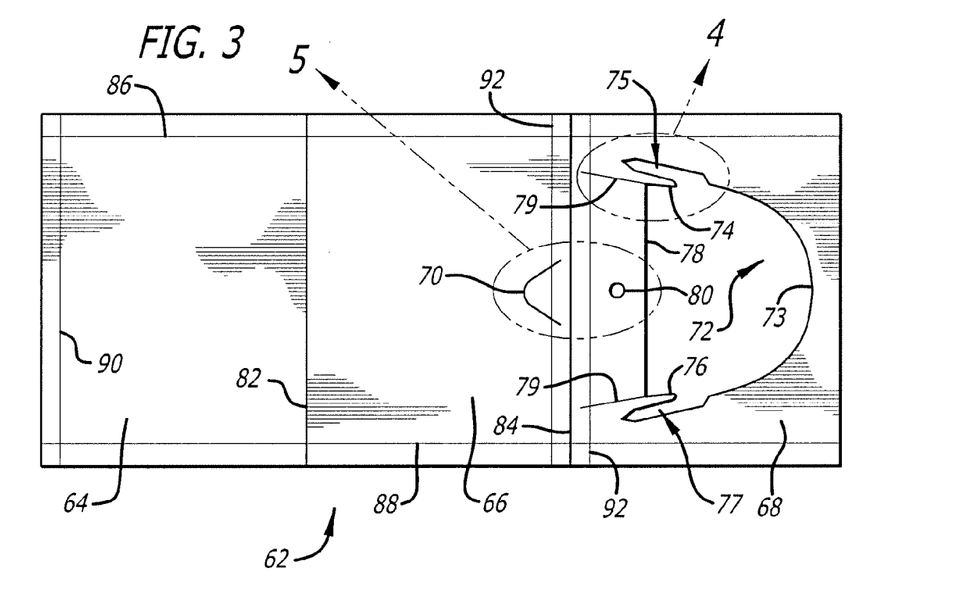
FIG. 3 is a top view of a blank for a front endsheet used for forming part of a media package.
Figure 5:
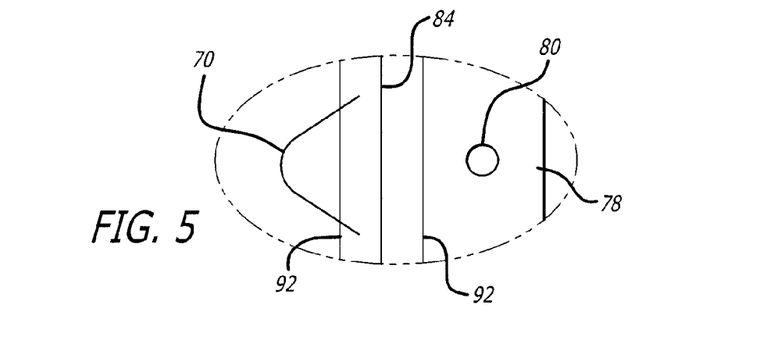
FIG. 5 is a detailed view of a thumb notch and a waste strip removal portion of FIG. 3.

Turning now to FIG. 3, a front endsheet blank 62 is shown. The front endsheet blank 62 comprises a first panel 64, a second panel 66, and a third panel 68. The first panel 64 is adapted to attach to a hard cover of the book-like package. The second panel 66 has a thumb notch score line 70 formed therein. The thumb notch score line 70 is formed during a stamping that creates the front endsheet blank 62 from a sheet of material. FIG. 5 shows the thumb notch score line 70 in additional detail.

The third panel 68 of the front endsheet blank 62 has a disc receiving opening 72 formed therein. The disc receiving opening 72 is formed during the stamping. The disc receiving opening 72 has a partially circular periphery 73. The partially circular periphery 73 is sized so as to be generally identical in shape and size to an outer periphery of a media disc, such as a CD, DVD, or Blu-ray disc.

The third panel 68 additionally comprises a first disc securing lug 74. The first disc securing lug 74 additionally has an inner periphery with an arc-shape so as to complement the outer periphery of the media disc. A first gap 75 is formed during the stamping process and is disposed adjacent the first disc securing lug 74. The first gap 75 is in communication with the disc receiving opening 72. The first gap 75 allows the first disc securing lug 74 to flex outward, toward a top periphery of the third panel 68, when a media disc is inserted into a book-like package.

Figure 4:
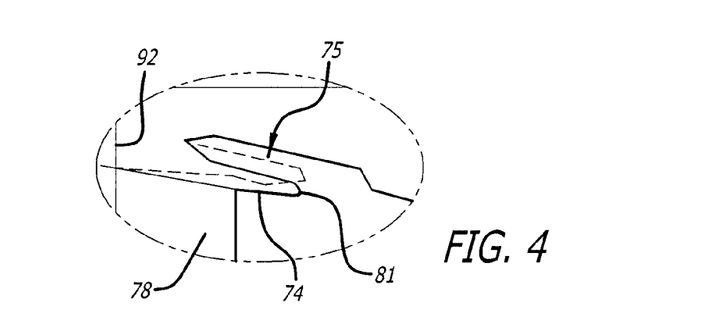
FIG. 4 is a detailed view of a disc securing lug portion of FIG. 3.

FIG. 4 shows a more detailed view of the first disc securing lug 74. The first disc securing lug 74 is also shown in broken lines in a flexed position to allow a disc to pass in or out of the disc receiving opening 72. As shown in the flexed position, the first disc securing lug resides at least partially within the first gap 75. The disc securing lug has a rounded distal end 81 to allow a disc being removed from the disc receiving opening 72 to flex the first disc securing lug 74 into the first gap to allow the disc to be removed from the disc receiving opening 72.

The third panel 68 also comprises a second disc securing lug 76. The second disc securing lug 72 additionally has an inner periphery with an arc-shape so as to complement the outer periphery of the media disc. A second gap 77 is formed during the stamping process and is disposed adjacent the second disc securing lug 76. The second gap 77 is in communication with the disc receiving opening 72. The second gap 77 allows the second disc securing lug 76 to flex outward, toward a bottom periphery of the third panel 68, when a media disc is inserted into a book-like package.

The first disc securing lug 74 and the second disc securing lug 76 allow a media disc to be secured within the book-like package like the first and second disc securing lugs 26, 28 described above in connection with FIG. 2.

Additionally, the third panel 68 comprises a waste strip 78. The waste strip 78 is removed during additional manufacturing steps of the book-like package. The waste strip 78 is provided with score lines 79 on each side of the waste strip 78, providing the waste strip 78 with a generally trapezoidal shape. The waste strip 78 is removed during a cutting operation that provides access to the disc receiving portion 72 once the book-like package is assembled. The waste strip 78 has a hole 80 formed therein. The hole 80 is provided in order to facilitate removal of the waste strip 78 following the cutting operation that provides access to the disc receiving portion 73 once the book-like package is assembled.

A first score line 82 is provided between the first panel 64 and the second panel 66. The first score line 82 allows the first panel 64 to fold relative to the second panel 66. A second score line 84 is provided between the second panel 66 and the third panel 68. The second score line 84 allows the third panel 68 to fold relative to the second panel 66. The score lines 82, 84 are formed on the blank 62 during the punching of the sheet. The score lines 82, 84 thus provide locations where the panels 64, 66, 68 may be folded relative to an adjacent panel.

In addition to the score lines 82, 84, FIG. 3 additionally depicts trim lines 86, 88, 90, and 92 on the blank 62. The trim lines 86, 88, 90 and 92 indicate locations of the blank 62 that will be cut away when the blank 62 is used in the formation of a book-like package. For instance, the first trim line 86 is disposed proximate a top surface of the blank 62 and runs through all three panels 64, 66, and 68. Similarly, the second trim line 88 is disposed proximate a bottom surface of the blank 62 and runs through all three panels 64, 66, and 68. Thus, the first trim line 86 and the second trim line 88 reduce the height of the blank 62.

The third trim line 90 is shown the first panel 64. The third trim line 90 reduces the width of the first panel 64.

The fourth trim line 92 is shown on both the second panel 66 and the third panel 68. The fourth trim line 92 is made after the third panel 68 has been adhesively secured to the second panel 66, as described in greater detail below. The fourth trim line 92 intersects with the score lines 79 of the waste strip 78, thus the fourth trim line 92 will allow the separation of the waste strip 78 from the third panel 68. The fourth trim line 92 additionally intersects with the thumb notch score line 70. Thus, the thumb notch score line 70 will allow the thumb notch to be formed in the second panel 66, by the removal of material from the second panel 66 and the thumb notch may be in communication with the disc receiving opening 72, allowing access to a disc within the disc receiving opening 72 when the third panel 68 is adhesively secured to the second panel 66.

Figure 6:
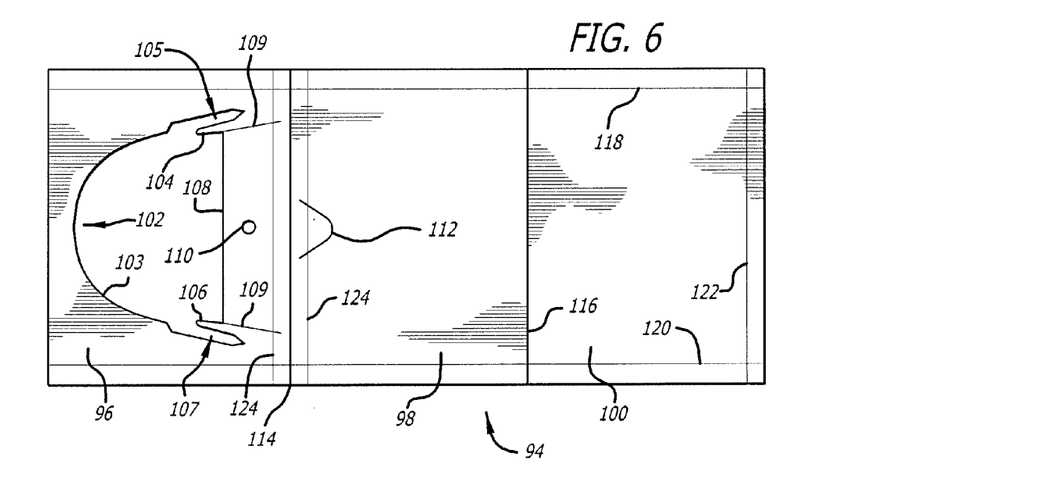
FIG. 6 is a top view of a blank for a back endsheet used for forming part of a media package.

FIG. 6 shows a back endsheet blank 94 that is similar to the front endsheet blank 62 described in connection with FIG. 3. The back endsheet blank 94 comprises a first panel 96, a second panel 98, and a third panel 100. The third panel 100 is adapted to attach to a hard cover of the book-like package. The second panel 98 has a thumb notch score line 112 formed therein. The thumb notch score line 112 is formed during a stamping that creates the back endsheet blank 94 from a sheet of material.

The first panel 96 of the back endsheet blank 94 has a disc receiving opening 102 formed therein. The disc receiving opening 102 is formed during the stamping. The disc receiving opening 102 has a partially circular periphery 103. The partially circular periphery 103 is sized so as to be generally identical in shape and size to an outer periphery of a media disc, such as a CD, DVD, or Blu-ray disc.

The first panel 96 additionally comprises a first disc securing lug 104. The first disc securing lug 104 additionally has an inner periphery with an arc-shape so as to complement the outer periphery of the media disc. A first gap 105 is formed during the stamping process and is disposed adjacent the first disc securing lug 104. The first gap 105 is in communication with the disc receiving opening 102. The first gap 105 allows the first disc securing lug 104 to flex outward, toward a top periphery of the first panel 96, when a media disc is inserted into a book-like package.

The first panel 96 also comprises a second disc securing lug 106. The second disc securing lug 106 additionally has an inner periphery with an arc-shape so as to complement the outer periphery of the media disc. A second gap 107 is formed during the stamping process and is disposed adjacent the second disc securing lug 106. The second gap 107 is in communication with the disc receiving opening 102. The second gap 107 allows the second disc securing lug 106 to flex outward, toward a bottom periphery of the first panel 96, when a media disc is inserted into a book-like package.

The first disc securing lug 104 and the second disc securing lug 106 allow a media disc to be secured within the book-like package like the first and second disc securing lugs 26, 28 described above in connection with FIG. 2.

Additionally, the first panel 96 comprises a waste strip 108. The waste strip 108 is removed during additional manufacturing steps of the book-like package. The waste strip 108 is provided with score lines 109 on each side of the waste strip 108, providing the waste strip 108 with a generally trapezoidal shape. The waste strip 108 is removed during a cutting operation that provides access to the disc receiving portion 102 once the book-like package is assembled. The waste strip 108 has a hole 110 formed therein. The hole 110 is provided in order to facilitate removal of the waste strip 108 following the cutting operation that provides access to the disc receiving portion 102 once the book-like package is assembled.

A first score line 114 is provided between the first panel 96 and the second panel 98. The first score line 114 allows the first panel 96 to fold relative to the second panel 98. A second score line 116 is provided between the second panel 98 and the third panel 100. The second score line 116 allows the third panel 100 to fold relative to the second panel 98. The score lines 114, 116 are formed on the blank 94 during the punching of the sheet. The score lines 114, 116 thus provide locations where the panels 96, 98, 100 may be folded relative to an adjacent panel.

In addition to the score lines 114, 116, FIG. 6 additionally depicts trim lines 118, 120, 122, and 124 on the blank 94. The trim lines 118, 120, 122 and 124 indicate locations of the blank 94 that will be cut away when the blank 94 is used in the formation of a book-like package. For instance, the first trim line 118 is disposed proximate a top surface of the blank 94 and runs through all three panels 96, 98, and 100. Similarly, the second trim line 120 is disposed proximate a bottom surface of the blank 94 and runs through all three panels 96, 98, and 100. Thus, the first trim line 118 and the second trim line 120 reduce the height of the blank 94.

The fourth trim line 122 is shown on the third panel 100. The fourth trim line 122 reduces the width of the third panel 100.

The third trim line 124 is shown on both the first panel 96 and the second panel 98. The third trim line 124 is made after the first panel 96 has been adhesively secured to the second panel 98, as described in greater detail below. The third trim line 124 intersects with the score lines 109 of the waste strip 108, thus the third trim line 124 will allow the separation of the waste strip 108 from the first panel 96. The third trim line 124 additionally intersects with the thumb notch score line 112. Thus, the thumb notch score line 112 will allow the thumb notch to be formed in the second panel 98, by the removal of material from the second panel 98 and the thumb notch will be in communication with the disc receiving opening 102, allowing access to a disc within the disc receiving opening 102 when the first panel 96 is adhesively secured to the second panel 98.

Figure 7:
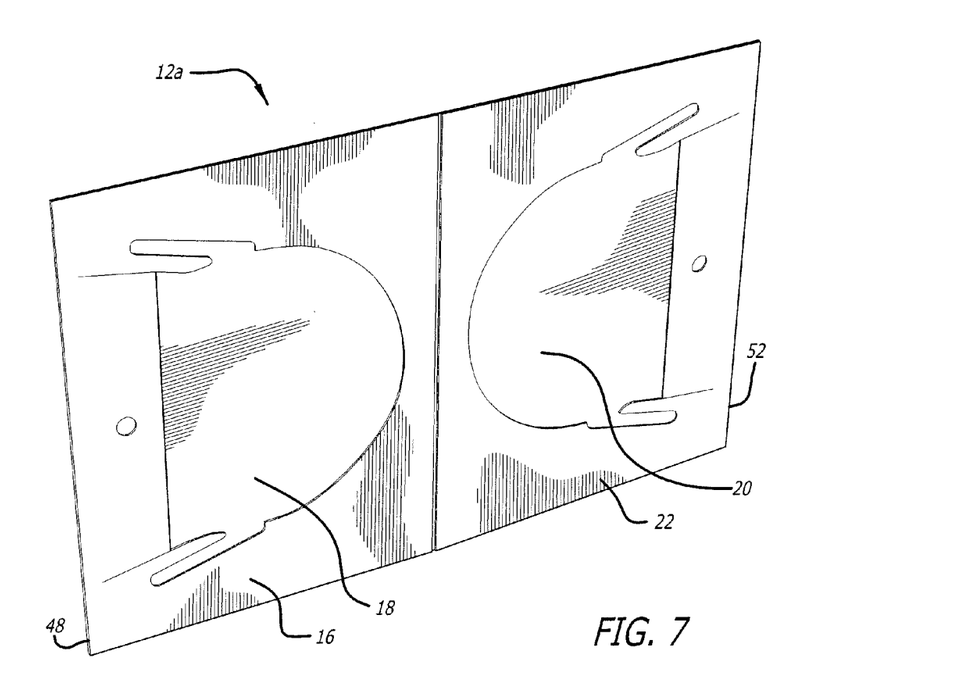
FIG. 7 is a perspective view of the page spread in an adhesively secured arrangement.

FIG. 7 shows the blank 12a with the first panel 16 adhesively secured to the second panel 18, as well as the fourth panel 22 adhesively secured to the third panel 20. The gluing, or adhesively securing, process may be an automated gluing process, or may be a hand gluing process. According to one process, glue, or another adhesive, is applied to the second panel 18, and the first panel 16 is folded via the score line 48 onto the second panel 18. Similarly, glue, or another adhesive, is applied to the third panel 20, and the fourth panel 20 is folded via the score line 52 onto the third panel 20. It is also contemplated that the glue, or another adhesive, may be applied to the first panel 16 in place of, or in addition to, the second panel 18 to secure the first panel 16 to the second panel 18. It is further contemplated that the glue, or another adhesive, may be applied to the fourth panel 22 in place of, or in addition to, the third panel 20 to secure the fourth panel 22 to the third panel 20.

Figures 8, 9:
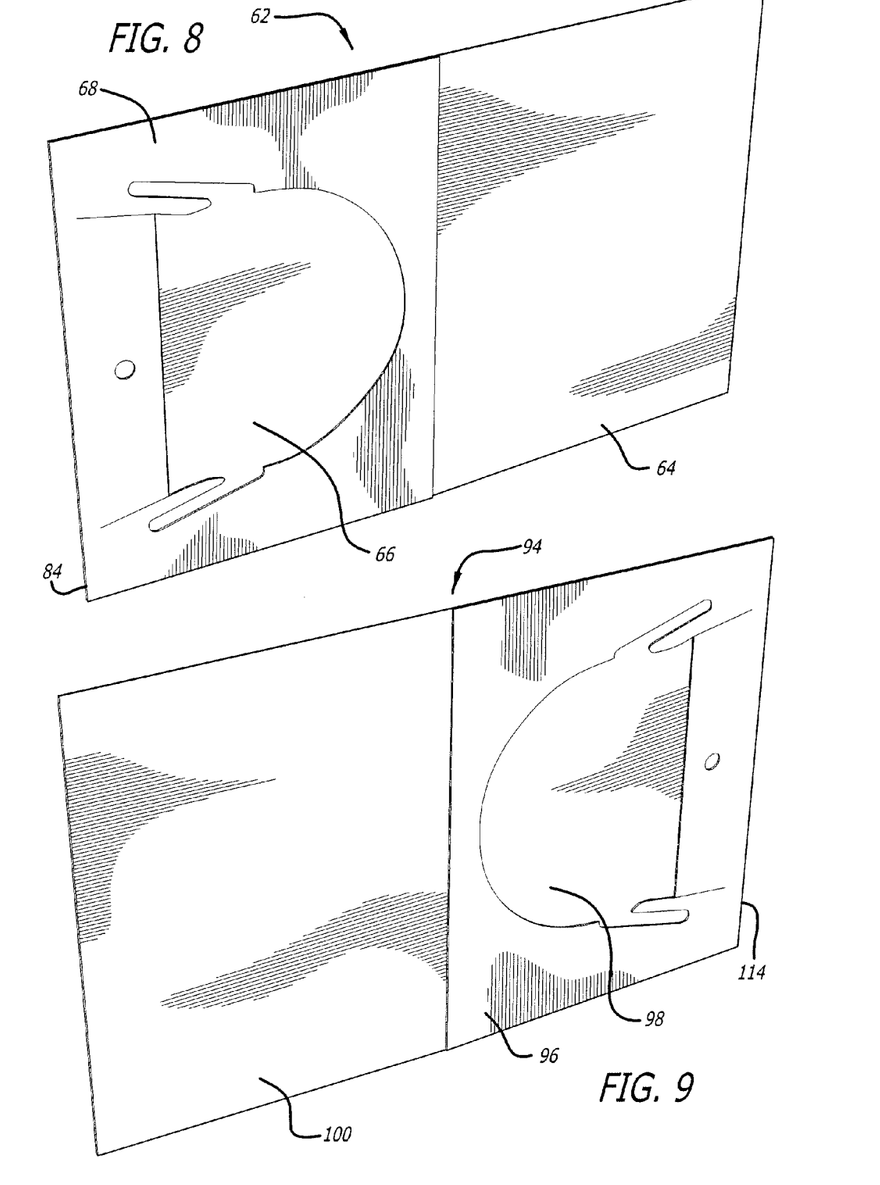
FIG. 8 is a perspective view of the front endsheet in an adhesively secured arrangement.
FIG. 9 is a perspective view of the back endsheet in an adhesively secured arrangement.

FIG. 8 shows the front endsheet blank 62 with the third panel 68 adhesively secured to the second panel 66. The gluing process may be an automated gluing process, or may be a hand gluing process. According to one process, glue, or another adhesive, is applied to the second panel 66, and the third panel 68 is folded via the score line 84 onto the second panel 68. It is also contemplated that the glue, or another adhesive, may be applied to the third panel 68 in place of, or in addition to, the second panel 66 to secure the third panel 68 to the second panel 66.

FIG. 9 shows the back endsheet blank 94 with the first panel 96 adhesively secured to the second panel 98. The gluing process may be an automated gluing process, or may be a hand gluing process. According to one process, glue, or another adhesive, is applied to the second panel 98, and the first panel 96 is folded via the score line 114 onto the second panel 98. It is also contemplated that glue, or another adhesive, may be applied to the first panel 96 in place of, or in addition to, the second panel 98 to secure the first panel 96 to the second panel 98.

Figure 10:
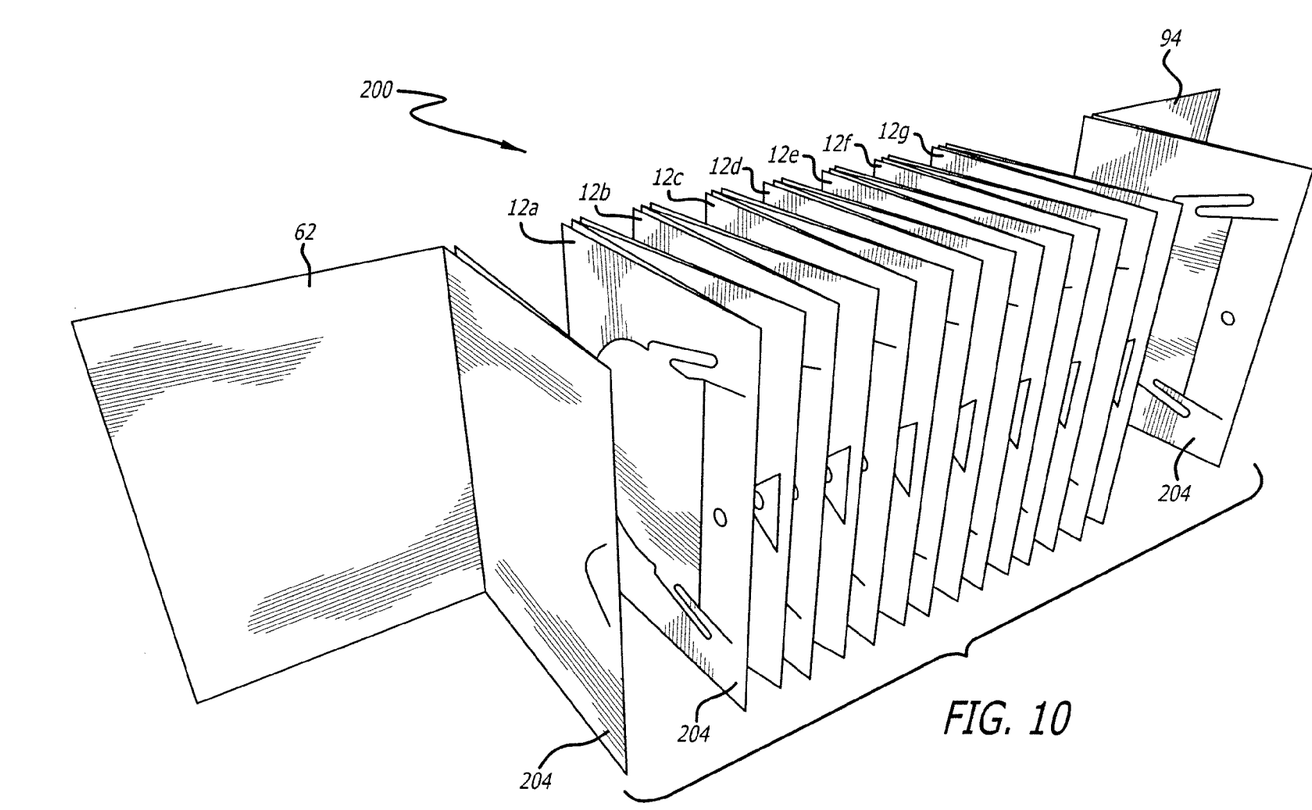
FIG. 10 is a perspective view of media package in an unassembled arrangement.

FIG. 10 shows a book-like package 200 that is about to be assembled from a front endsheet blank 62, a back endsheet blank 94, and a plurality of page spread blanks 12a-12g. All of the blanks 62, 94, 12a-12g have been adhesively secured according to the methods previously described. The blanks 62, 94, 12a-12g are placed into a fixture in order to glue, or adhesively secure, adjacent ones of the blanks 62, 94, 12a-12g together so that panels having disc receiving openings are adhesively secured together. The arrangement of the blanks 62, 94, 12a-12g provides that two disc receiving openings of adjacent panels will be positioned to face each other. Thus, a disc receiving pocket is created by the two disc receiving openings of the adjacent panels once the waste strips 30, 44, 78, 108 are removed. Therefore, a total of four disc securing lugs will be present in each disc receiving pocket, two from each of the adjacent panels.

Once the book-like package 200 is created, a trimming process may occur. The trimming process trims each blank 62, 94, 12a-12g along the trim lines previously described. For instance, a guillotine may be used to trim along the top edge, the bottom edge, and an side edge 204. It is contemplated that a rod may be placed through the openings 32, 46, 80, 110 of the blanks 62, 94, 12a-12g following the trimming along the side edge 204 in order to facilitate removal of the waste strips 30, 44, 78, 108 following the trimming along the side edge 204. When a rod is used, the rod may easily pull out the waste strips 30, 44, 78, 108 from the blanks 62, 94, 12a-12g. Once the waste strips 30, 44, 78, 108 are removed, access to the disc receiving pockets from the unbound edge 204 is provided.

Once the trimming of the book-like package 200 is complete, the book-like package 200 may then be joined to a cover in order to provide a finished media holding package.

Figure 11:
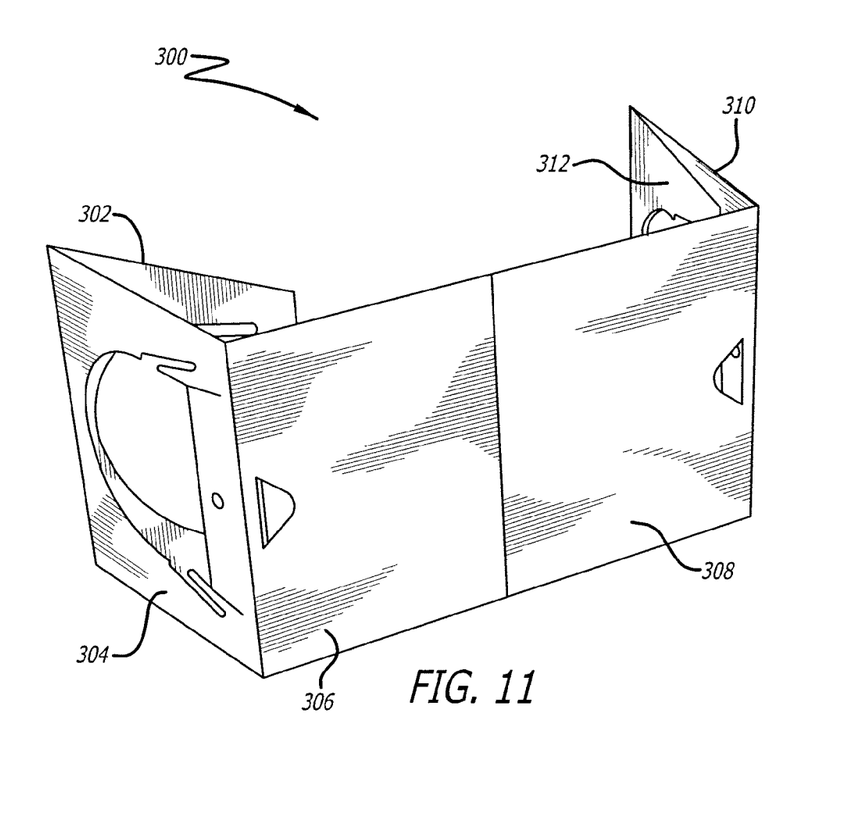
FIG. 11 is a perspective view of a page spread in an unadhesively secured arrangement according to another embodiment.
Figure 12:
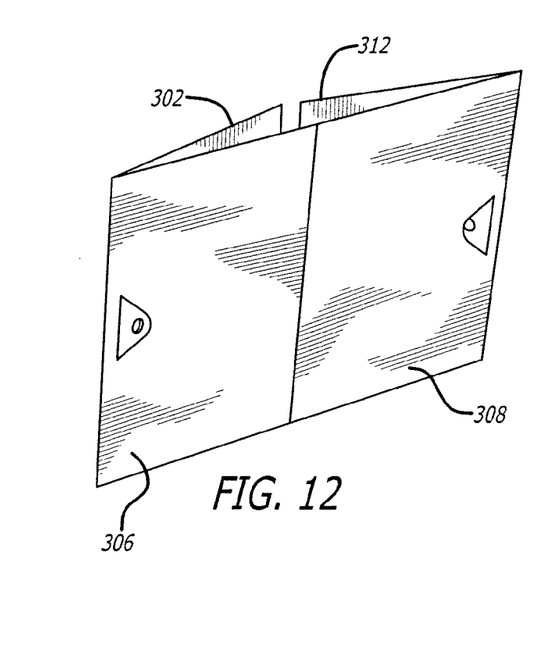
FIG. 12 is a perspective view of the page spread in a partially adhesively secured arrangement according to the embodiment of FIG. 11.
Figure 13:
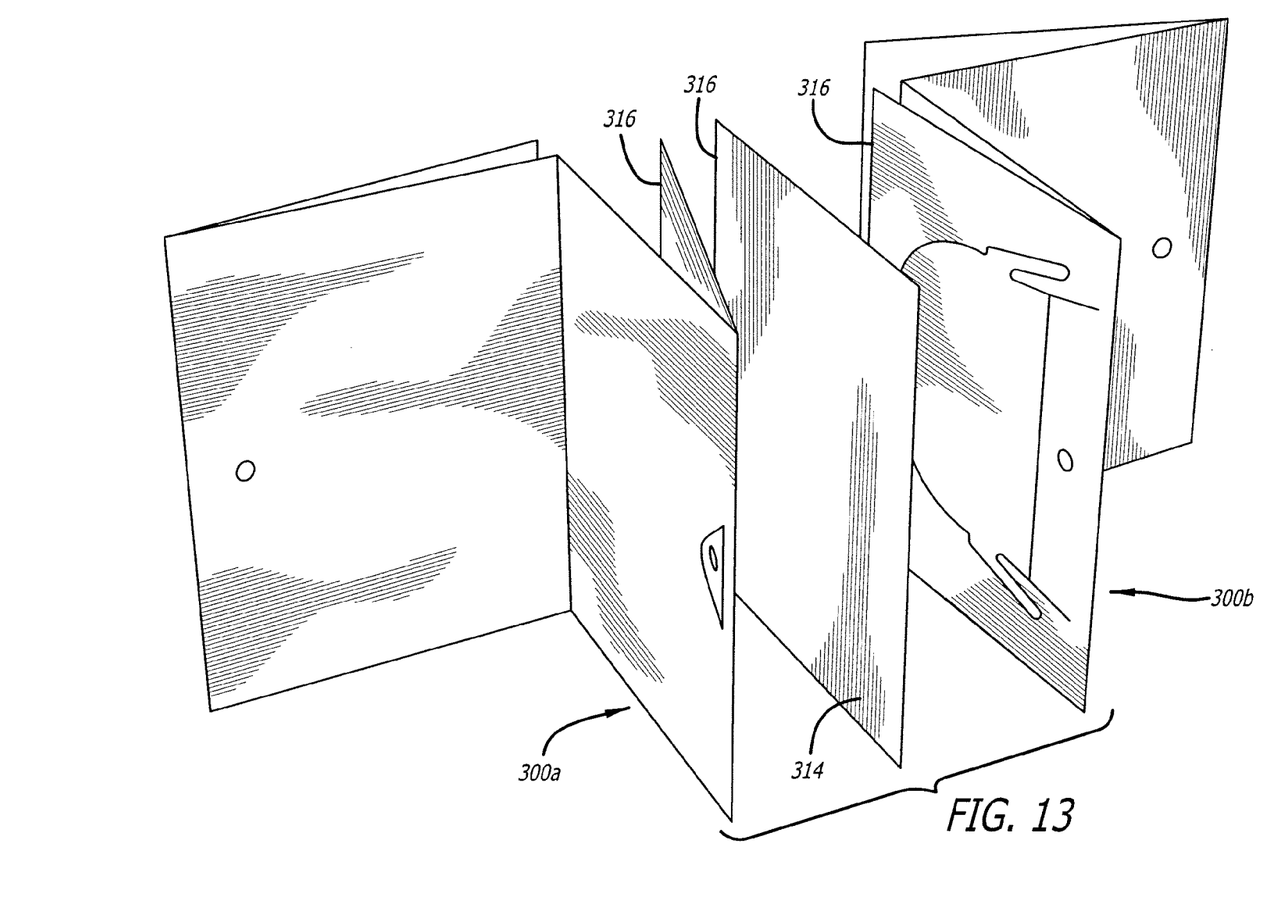
FIG. 13 is a perspective view of a portion of a media package made from the page spread of FIG. 11.

FIGS. 11-13 show a page spread blank for a media holding package according to another embodiment. As shown in FIGS. 11-13 a page spread blank 300 is provided that is adapted to contain two discs per blank 300. The blank 300 is similar to the page spread blank 12a, except that two additional panels with disc receiving openings are provided. Thus, alternative blank 300 has six panels instead of the four panels found in blank 12a. The blank 300 comprises a first panel 302 with a disc receiving opening, a second panel 304 with a disc receiving opening, a third panel 306, a fourth panel 308, a fifth panel 310 with a disc receiving opening, and a sixth panel 312 with a disc receiving opening. The first, second, fifth, and sixth panels 302, 304, 310, 312 contain generally identical features to those described above with respect to panels having disc receiving openings, such as disc securing lugs, and waste strips.

FIG. 12 shows the page spread blank 300 during a gluing, or adhesive connecting, process. The first panel 302 is adhesively secured to the second panel 304. The first panel 302 is then adhesively secured to the third panel 306. Similarly, the sixth panel 312 is adhesively secured to the fifth panel 310, and then the sixth panel 312 is adhesively secured to the fourth panel 308.

FIG. 13 shows how a plurality of page spread blanks 300a, 300b may be assembled as part of a media holding package.

An intermediate panel 314 is provided between two adjacent page spread blanks 300a, 300b. Glue, or another adhesive, is provided along edge 316 of the page spread blanks 300a, 300b and the intermediate panel 314. The assembled blanks 300a, 300b and the intermediate panel 314 may then be trimmed to provide access to the disc receiving openings as described above.

It is additionally contemplated that the waste strips may be removed during the stamping process, however, it has been found that the trimming process provides a more aesthetically pleasing appearance with the waste strips being present.

While the embodiments shown depict the disc receiving opening being accessed from a lateral edge of the blanks, it is also contemplated that according to an alternate embodiment that the disc receiving opening may be accessed from a top edge or a bottom edge of the blank.

It is contemplated that the blanks may be formed from a variety of paper and paperboard materials. One type of paperboard material that has been found acceptable for typical DVD packaging is SBS paperboard with a thickness of between 0.24 pt and 0.32 pt. It is contemplated that in an embodiment intended to hold fewer than five discs, a paperboard with a thickness of between 0.18 pt and 0.20 pt is also acceptable.

While specific embodiments have been illustrated and described, numerous modifications come to mind without significantly departing from the spirit of the invention, and the scope of protection is only limited by the scope of the accompanying claims.

What is claimed is:

1. A blank for use in forming a book-like package comprising:
    a first panel having a first disc receiving opening formed by stamping a sheet from which the blank is formed, a first disc securing lug formed in the panel during the stamping and lying within the plane of the panel, disposed proximate a periphery of the first disc receiving opening and projecting inward from the periphery of the disc receiving opening in the plane of the panel and extending inward and away from the periphery of the first disc receiving opening, the first disc securing lug being elongated, along a direction of its in-plane extension away from the periphery of the first disc receiving opening, with respect to its width, and a second disc securing lug formed in the panel during the stamping and lying within the plane of the panel, disposed proximate a periphery of the first disc receiving opening in the plane of the panel and projecting inward from the periphery of the first disc receiving opening and extending inward and away from the periphery of the first disc receiving opening, the second disc securing lug being elongated, along a direction of its in-plane extension away from the periphery of the first disc receiving opening, with respect to its width, the second disc securing lug being disposed generally opposite of the first disc securing lug relative to the first disc receiving opening, the first and second disc securing lugs together defining an opening having a width less than a diameter of the first disc receiving opening, and wherein a first gap is disposed proximate the first disc securing lug and a second gap is disposed proximate the second disc securing lug, the first gap and the second gap being in communication with the disc receiving opening, the first gap receiving at least a portion of the first disc securing lug when a disc is placed into and removed from the disc receiving opening, and the second gap receiving at least a portion of the second disc securing lug when a disc is placed into and removed from the first disc receiving opening, and wherein the opening defined by the first and second disc securing lugs is defined by the inward extending portions thereof, and lies in the plane of the first disc receiving opening;
    a second panel being connected to the first panel; and
    a third panel being connected to the second panel.

2. A blank for use in forming a book-like package comprising:
    a first panel having a first disc receiving opening, a first disc securing lug disposed proximate a periphery of the first disc receiving opening and projecting inward from the periphery of the disc receiving opening and extending away from the periphery of the first disc receiving opening, the first disc securing lug being elongated, along a direction of its extension away from the periphery of the first disc receiving opening, with respect to its width, and a second disc securing lug disposed proximate a periphery of the first disc receiving opening and projecting inward from the periphery of the first disc receiving opening and extending away from the periphery of the first disc receiving opening, the second disc securing lug being elongated, along a direction of its extension away from the periphery of the first disc receiving opening, with respect to its width, the second disc securing lug being disposed generally opposite of the first disc securing lug relative to the first disc receiving opening, the first and second disc securing lugs together defining an opening having a width less than a diameter of the first disc receiving opening, and wherein a first gap is disposed proximate the first disc securing lug and a second gap is disposed proximate the second disc securing lug, the first gap and the second gap being in communication with the disc receiving opening, the first gap receiving at least a portion of the first disc securing lug when a disc is placed into and removed from the disc receiving opening, and the second gap receiving at least a portion of the second disc securing lug when a disc is placed into and removed from the first disc receiving opening;
    a second panel being connected to the first panel; and
    a third panel being connected to the second panel;
    a fourth panel having a second disc receiving opening, a third disc securing lug disposed proximate a periphery of the disc receiving opening and projecting inward from the periphery of the second disc receiving opening and extending away from the periphery of the second disc receiving opening, the third disc securing lug being elongated, along a direction of its extension away from the periphery of the second disc receiving opening, with respect to its width, and a fourth disc securing lug disposed proximate a periphery of the second disc receiving opening and projecting inward from the periphery of the second disc receiving opening and extending away from the periphery of the second disc receiving opening, the fourth disc securing lug being elongated, along a direction of its extension away from the periphery of the second disc receiving opening, with respect to its width, the fourth disc securing lug being disposed generally opposite of the third disc securing lug relative to the second disc receiving opening, the fourth panel being connected to the third panel, the third and fourth disc securing lugs together defining an opening having a width less than a diameter of the second disc receiving opening, and wherein a third gap is disposed proximate the third disc securing lug and a fourth gap is disposed proximate the fourth disc securing lug, the third gap and the fourth gap being in communication with the second disc receiving opening, the third gap receiving at least a portion of the third disc securing lug when a disc is placed into and removed from the disc receiving opening, and the fourth gap receiving at least a portion of the fourth disc securing lug when a disc is placed into and removed from the second disc receiving opening.

3. The blank of claim 1, wherein the first panel further comprises a first waste strip disposed proximate the first disc receiving opening, the waste strip being disposed between the first disc securing lug and the second disc securing lug.

4. The blank of claim 3, wherein the first waste strip has a hold formed therein.

5. The blank of claim 1, wherein the second panel has a thumb notch formed through the second panel, the thumb notch being positioned proximate an edge of the second panel adjacent to the first panel.

6. The blank of claim 5, wherein the third panel has a thumb notch formed through the third panel, the thumb notch being positioned proximate an edge of the third panel opposite an edge of the third panel that is connected to the second panel.

7. The blank of claim 1 further comprising:
a first score line disposed between the first panel and the second panel, the first score line providing a folding location for the first panel relative to the second panel; and
a second score line disposed between the second panel and the third panel, the second score line providing a folding location for the second panel relative to the third panel.

8. The blank of claim 1, wherein the blank is formed from SBS paperboard.

9. The blank of claim 1, wherein the blank has a thickness of from about 0.18 pt to about 0.32 pt.

10. The blank of claim 1 further comprising a gloss lamination strip disposed on at least one of the second panel and the third panel.

* * * * *